3,047,512
HALOPHOSPHATE PHOSPHOR TREATMENT PROCESS

William C. Martyny, Lyndhurst, Ohio, assignor to General Electric Company, a corporation of New York
No Drawing. Filed Feb. 29, 1960, Ser. No. 11,432
5 Claims. (Cl. 252—301.4)

This invention relates to the treatment of luminescent material and more particularly to a washing process for improving the luminescent output of alkaline earth halophosphate phosphors as used in electric discharge lamps, particularly in fluorescent lamps.

Alkaline earth halophosphate phosphors are the luminescent materials most commonly used in fluorescent lamps today. In general, halophosphates are compounds more or less analogous to the natural mineral apatite and are considered to be represented by a formula such as $3M_3(PO_4)_2 \cdot 1M'L_2$, where L represents a halogen or mixture of halogens, and M and M' represent either different or identical alkaline earth metals or mixtures of such metals. Such artificially produced compounds useful as luminescent materials or phosphors when suitably activated, are disclosed in Patent 2,488,733, McKeag et al. The most commonly used halophosphate phosphor is calcium halophosphate believed to have the following formula: $3Ca_3(PO_4)_2 \cdot Ca(F,Cl)_2$. Antimony is used as an activator to contribute a luminous emission band in the blue region, and maganese as a second activator to contribute an emission band in the orange-red region; various qualities or color temperatures of white are obtained by varying the proportions of the two activators. This phosphor is usually made by mixing $CaHPO_4$, $CaCO_3$, $CaF_2$, $MnCO_3$, and $Sb_2O_3$ together as a dry mixture and firing this mixture in trays at a temperature in the range from 1000 to 1200° C. It has been established that there are other than pure apatite structures present after the solid phase firing reaction of the phosphor. Some of these materials are antimony oxide, calcium pyrophosphate, calcium antimonate and manganese compounds.

In fluorescent lamp fabrication, the phosphor is subjected to a number of adverse conditions which reduce its response to ultraviolet exciting radiation and its reflectance and transmission of visible light. For instance, antimony compounds are quite easily reduced if they are subjected to reducing atmospheres, as may happen in the lehring operation and in the exhaust procedures of lamp processing. The presence of a reducible antimony compound in a halophosphate phosphor may readily be shown by exposing a moist cake of the phosphor to hydrogen sulfide gas for a short interval. The surface of the cake turns bright orange, indicating the formation of antimony sulfide. When reduced antimony is present in a lamp phosphor during operation of the lamp, poor lamp maintenance results, probably from attachment of mercury to the antimony. Apparently this is due to the affinity of mercury for antimony and it causes the phosphor to develop a grayish cast.

Manganese on the other hand may be adversely affected by oxidizing conditions which may be present at some stages of lamp manufacturing. This probably results in the formation of manganese containing compounds which absorb both ultraviolet and visible light, thereby further reducing the response. Calcium present in other than the apatite structure is also believed to have a deleterious effect on lamp performance and lumen maintenance.

It thus appears that the major reduction in brightness of the phosphor after lamp manufacture and seasoning is due to the presence of materials such as antimony, manganese and calcium which are not incorporated or firmly bound into the apatite structure or phosphor crystal lattice. It might therefore be expected that improvements in phosphor brightness and lamp maintenance could be achieved by removing these undesirable materials. In the past, attempts have been made to use both inorganic and organic acids of various kinds to remove some of these materials. Usually these washing treatments have removed only one material at a time and they have not been too effective because considerable difficulty is encountered in preventing either the unreacted materials, or the compounds which are formed with the washing agent, from precipitating back on the phosphor surfaces before the liquid and phosphor can be separated.

Therefore the object of the invention is to provide a new and improved treatment for improving the brightness and maintenance of alkaline earth halophosphate phosphors.

A more specific object of the invention is to provide a washing treatment for removing deleterious compounds such as compounds of antimony and manganese and calcium which are present in alkaline earth halophosphate phosphors but not firmly bound into the phosphor crystal lattice.

In accordance with the invention, I have established that a substantial improvement in brightness, ultraviolet response, and maintenance of alkaline earth halophosphate phosphors is achieved by washing them with a sequestering agent which will chelate the metal cations and bind them in a stable structure. I have determined that ethylenediamine tetraacetic acid, a solid which dissolves readily in an aqueous basic solution, is outstanding in this respect and superior to any other feasible compound. An ammoniacal solution of ethylenediamine tetraacetic acid used in sufficient concentration will take into solution and also maintain in solution calcium, manganese and antimony cations. With this solution, the liquid and the phosphor may be separated by means of centrifuging and without relasing any of the deleterious residual materials back into the phosphor.

Ethylenediamine tetraacetic acid may be described as a sequestering agent. It binds a metal ion by forming a metal chelate. Ethylenediamine tetraacetic acid occurs as a large molecule and the metal chelate formation consists in incorporating a metallic ion into its structure in such a way as to form a stable complex.

The ammoniated ethylenediamine tetraacetic acid compound may be represented by the following formula:

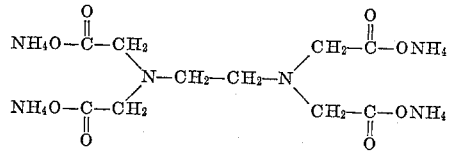

In the metal chelate formation, a ring structure is formed with the metal ion consisting for example of manganese, as follows:

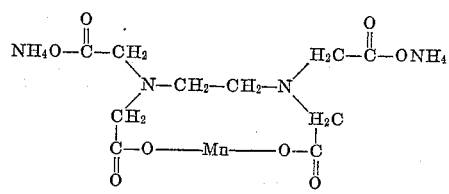

The following will illustrate the application to a phosphor lot of the washing treatment in accordance with the invention. The materials used are:

1500 grams of calcium halophosphate phosphor
1000 ml. of deionized water
150 ml. of ammonium hydroxide
75 grams of ethylenediamine tetraacetic acid (high purity)

The material is charged into a one gallon ball mill and rotated for approximately three hours. The slurry from the mill is filtered or centrifuged to separate the phosphor from the liquid. The washed phosphor cake is then rinsed with deionized ammoniated water to remove any residual ethylenediamine tetraacetic acid, and then with clear deionized water. The phosphor may then be suspended in a suitable vehicle or suspension system for coating fluorescent lamps. Preferably a water soluble coating suspension is used; a suitable one comprising an ammoniated solution of a copolymer of vinyl methyl ether and maleic anhydride is described and claimed in my copending application No. 625,942 filed December 3, 1956, and assigned to the same assignee as the present invention.

When a chemical analysis of the wash liquid resulting from the filtering or centrifuging above is carried out, the undesirable materials or impurities found in the wash include calcium, manganese and antimony. For instance, in the wash water from the charge above, the following quantities of impurities are found:

4.80 grams of calcium
0.24 gram of antimony
0.08 gram of antimony

I have also determined that alkaline earth pyrophosphates as well as some other non-luminescent compounds which may be present in the phosphor are soluble to some degree in ammoniated ethylenediamine tetraacetic acid. The wash process in accordance with the invention also serves to remove or at least reduce in quantity such other materials present.

I have also determined that the use of a minor proportion of maleic acid along with ethylenediamine tetraacetic acid will speed up the metal cation chelating action and result in a more thoroughly washed phosphor. For instance, when 25 grams of maleic acid are added to the above-described mill charge, all other conditions remaining the same, the wash water after filtering or centrifuging is found to contain the following amounts of undesirable metals.

5.80 grams of calcium
0.31 gram of manganese
0.19 gram of antimony

The very substantial improvement in the amount of antimony removed as a result of the addition of maleic acid will be noted in particular.

I have made a series of tests to determine the amount of ethylenediamine tetraacetic acid required to achieve satisfactory washing of the usual alkaline earth halophosphate phosphors used in fluorescent lamp manufacturing. The amount of ethylenediamine tetraacetic acid required depends upon the concentration of impurities; in general, for the average phosphor run, a minimum of approximately 3% by weight relative to weight of phosphor is desirable. For example, in the mill charge described above, a minimum of 50 grams of ethylenediamine tetraacetic acid is desirable for the 1500 gram lot of phosphor. There is no maximum as regards the percentage of ethylenediamine tetraacetic acid which may be used, providing of course all of the residual ethylenediamine tetraacetic acid is rinsed out. However there is no further benefit or advantage from using amounts exceeding about 7% by weight relative to weight of phosphor, for instance 100 grams in the case of the 1500 gram mill charge of phosphor. Since the material is relatively costly, it is desirable of course to avoid the use of greater amounts than necessary.

As regards the proportion of maleic acid in the preferred wash treatment in accordance with the invention, it is desirable to use a quantity of maleic acid in the range of 10 to 50% by weight of the quantity of ethylenediamine tetraacetic acid. For instance, in the mill charge given above by way of example, the weight of maleic acid used is 25 grams and this amounts to 33% of the weight of ethylenediamine tetraacetic acid.

Tests and production data indicate the following advantages and benefits for lamps using halophosphate phosphors washed in accordance with the invention:

(a) A lumen gain of 50 to 75 lumens at the end of the first 100 hours of operation in the case of a 3000 lumen, 40-watt cool white fluorescent lamp.

(b) A gain in maintenance of approximately 3% at the end of 3000 hours of operation.

It is surprising that the improvements in phosphor brightness and maintenance resulting from the wash with ethylenediamine tetraacetic acid and preferably including a minor proportion of maleic acid are so much superior to the results obtained with any other materials. I have carried out many washes with various other materials consisting of inorganic and organic acids, and in no case have I found the cleaning as satisfactory as with ethylenediamine tetraacetic acid. It is believed that the principal reason for this is the ability of the large organic ethylenediamine tetraacetic acid molecule to form a stable ring structure which ties up the various deleterious metal ions present, and particularly calcium, manganese, and antimony, into a strong stable complex. Thus these deleterious materials are prevented from combining with the phosphor or precipitating out on the phosphor surface during the filtering or centrifuging steps.

The foregoing example and specific details of the washing process in accordance with the invention are intended as illustrative and not as limitative of the invention. The scope of the invention is to be determined by the appended claims.

What I claim as new and desire to secure by Letters Patent of the United States is:

1. A process for improving the brightness and maintenance of alkaline earth halophosphate phosphors which comprises thoroughly agitating the phosphor in an ammoniacal solution of ethylenediamine tetraacetic acid containing at least 3% by weight of ethylenediamine tetraacetic acid relative to weight of phosphor, separating the phosphor from the liquid, and rinsing the phosphor to remove residual ethylenediamine tetraacetic acid.

2. A process for improving the brightness and maintenance of alkaline earth halophosphate phosphors which comprises thoroughly agitating the phosphor in an ammoniacal solution of ethylenediamine tetraacetic acid containing from 3% to 7% by weight of ethylenediamine tetraacetic acid relative to weight of phosphor, separating the phosphor from the liquid, and rinsing the phosphor to remove residual ethylenediamine tetraacetic acid.

3. The method of treating alkaline earth halophosphate phosphors to improve their brightness and maintenance which comprises agitating the phosphor in an ammoniacal solution containing at least 3% by weight of ethylenediamine tetraacetic acid relative to weight of phosphor and a minor proportion of maleic acid less than 50% by weight relative to ethylenediamine tetraacetic acid, separating the phosphor from the liquid, and rinsing the phosphor to remove any residual ethylenediamine tetraacetic acid and maleic acid.

4. The method of treating alkaline earth halophosphate phosphors to improve their brightness and maintenance which comprises agitating the phosphor in an ammoniacal solution containing from 3% to 7% by weight of ethylenediamine tetraacetic acid relative to weight of phosphor, and a minor proportion of maleic acid less than 50% by weight relative to ethylenediamine tetraacetic acid, separating the phosphor from the liquid, and rinsing the phosphor to remove any residual ethylenediamine tetraacetic acid and maleic acid.

5. The method of treating alkaline earth halophosphate phosphors to improve their brightness and maintenance which comprises milling the phosphor in an ammoniacal solution containing from 3% to 7% by weight of ethylenediamine tetraacetic acid relative to weight of phosphor and maleic acid in a proportion of 10 to 50% by weight relative to weight of ethylenediamine tetraacetic acid, centrifuging to separate the phosphor from the liquid, and rinsing the phosphor to remove any residual ethylenediamine tetraacetic acid and maleic acid.

References Cited in the file of this patent

UNITED STATES PATENTS

| | | |
|---|---|---|
| 2,691,601 | Butler | Oct. 12, 1954 |
| 2,966,464 | Ropp | Dec. 27, 1960 |
| 2,980,627 | Swindells | Apr. 18, 1961 |

OTHER REFERENCES

Versenes: Technical Bulletin No. 2, Bersworth Chem. Co., Framingham, Mass., fifth ed., 1952, pp. 44–45, Sec. 11.